United States Patent [19]

Joshi et al.

[11] 4,263,377

[45] Apr. 21, 1981

[54] CATHODES FOR PRIMARY SOLID STATE LITHIUM CELLS

[75] Inventors: Ashok V. Joshi, Levittown, Pa.; Charles C. Liang, Clarence, N.Y.

[73] Assignee: Duracell International Inc., Bethel, Conn.

[21] Appl. No.: 129,144

[22] Filed: Mar. 10, 1980

Related U.S. Application Data

[63] Continuation of Ser. No. 960,371, Nov. 13, 1978, abandoned, which is a continuation-in-part of Ser. No. 790,800, Apr. 25, 1977, abandoned.

[51] Int. Cl.$^3$ ............................................. H01M 6/18
[52] U.S. Cl. ...................................... 429/50; 429/191; 429/218
[58] Field of Search ........................... 429/50, 191, 218

[56] References Cited

U.S. PATENT DOCUMENTS

| 3,791,867 | 2/1974 | Broadhead et al. | 429/191 |
| 3,988,164 | 10/1976 | Liang et al. | 429/191 |
| 4,009,052 | 2/1977 | Whittingham | 429/191 |

*Primary Examiner*—Donald L. Walton
*Attorney, Agent, or Firm*—Ronald S. Cornell; Israel Nissenbaum; Martin M. Glazer

[57] ABSTRACT

High energy density primary solid state cells using cathode materials of ionically and electronically conductive dischargeable compounds in combination with other non-conductive cathode active materials of higher energy density.

14 Claims, No Drawings

CATHODES FOR PRIMARY SOLID STATE LITHIUM CELLS

This is a continuation of application Ser. No. 960,371, filed Nov. 13, 1978, now abandoned, which is a continuation-in-part of application Ser. No. 790,800 filed Apr. 25, 1977, now abandoned.

This invention relates to primary high energy density cells utilizing solid electrolytes, solid active metal anodes and novel solid cathodes, and more particularly to such cells in which the cathodes contain an active material which is both ionically and electronically conductive.

Recently the state of electronics has achieved a high degree of sophistication especially in regard to devices utilizing integrated circuit chips which have been proliferating in items such as quartz crystal watches, calculators, cameras, pacemakers and the like. Miniaturization of these devices as well as low power drainage and relatively long lives under all types of conditions has resulted in a demand for power sources which have characteristics of rugged construction, long shelf life, high reliability, high energy density and an operating capability over a wide range of temperatures as well as concomitant miniaturization of the power source. These requirements pose problems for conventional cells having solution or even paste type electrolytes especially with regard to shelf life. The electrode materials in such cells may react with the electrolyte solutions and tend therefore to self discharge after periods of time which are relatively short when compared to the potential life of solid state batteries. There may also be evolution of gases in such cells which could force the electrolyte to leak out of the battery seals, thus corroding other components in the circuit which in sophisticated componentry can be very damaging. Increasing closure reliability is both bulky and costly and will not eliminate the problem of self discharge. Additionally, solution cells have a limited operating temperature range dependent upon the freezing and boiling points of the contained solutions.

Success in meeting the above demands without the drawbacks of solution electrolyte systems has been achieved with the use of solid electrolyte and electrode cells or solid state cells which do not evolve gases, self discharge on long standing or have electrolyte leakage problems. These systems however have had their own particular limitations and drawbacks not inherent in solution electrolyte cells.

Ideally a cell should have a high voltage, a high energy density, and a high current capability. Prior art solid state cells have however been deficient in one or more of the above desirable characteristics.

A first requirement and an important part of the operation of any solid state cell is the choice of solid electrolyte. In order to provide good current capability a solid electrolyte should have a high ionic conductivity which enables the transport of ions through defects in the crystalline electrolyte structure of the electrode-electrolyte system. An additional, and one of the most important requirements for a solid electrolyte, is that it must be virtually solely an ionic conductor. Conductivity due to the mobility of electrons must be negligible because otherwise the resulting partial internal short circuiting would result in the consumption of electrode materials even under open circuit conditions. Solution electrolyte cells include an electronically non-conductive separator between the electrode elements to prevent such a short circuit, whereas solid state cells utilize the solid electrolyte as both electronic separator and the ionic conductive species.

High current capabilities for solid state cells have been attained with the use of materials which are solely ionic conductors such as $RbAg_4I_5$ (0.27 $ohm^{-1}cm^{-1}$ room temperature conductivity). However, these conductors are only useful as electrolytes in cells having low voltages and energy densities. As an example, a solid state $Ag/RbAg_4I_5/RbI_3$ cell is dischargeable at 40 $mA/cm^2$ at room temperature but with about 0.2 $Whr/in^3$ and an OCV of 0.66 V. High energy density and high voltage anodic materials such as lithium are chemically reactive with such conductors thereby precluding the use of these conductors in such cells. Electrolytes which are chemically compatible with the high energy density and high voltage anode materials, such as LiI, even when doped for greater conductivity, do not exceed a conductivity of $5 \times 10^{-5}$ $ohm^{-1}cm^{-1}$ at room temperature. Thus, high energy density cells with an energy density ranging from about 5-10 $Whr/in^3$ and a voltage at about 1.9 volts for a $Li/LiI$-doped/$PbI_2$, PbS, Pb cell currently being produced are precluded from having an effective high current capability above 50 $\mu A/cm^2$ at room temperature. As a result of such relatively low current capabilities, practical rechargeability is generally precluded thereby making increased energy density of cells of primary importance. However, a further aggravation of the reduced current capability of high energy density cells is the low conductivity (both electronic and ionic) of active cathode materials. Accordingly, conductivity enhancers such as graphite for electronic conductivity and electrolyte for ionic conductivity are added to the cathode. The current capability of the cell is increased to the maximum allowed by the conductivity of the electrolyte but at the cost of reduced energy density of the cell because of the volume occupied by the non-cathode active conductivity enhancers.

Commercial feasibility in production of the electrolyte material is another factor to be considered in the construction of solid state cells. Thus, the physical properties of electrolytes such as $BaMg_5S_6$ and $BaMg_5Se_6$, which are compatible with a magnesium but not a lithium anode, and sodium beta aluminas such as $Na_2O.11\ Al_2O_3$, which are compatible with sodium anodes, will preclude the fabrication of solid state cells operable at room temperature and having a high energy density or current capability even when costly production steps are taken. These electrolytes have ceramic characteristics making them difficult to work with especially in manufacturing processes involving grinding and pelletization with such processes requiring a firing step for structural integrity. Furthermore, the glazed material so formed inhibits the essential (for solid state cells) good surface contact with the electrodes with a result of poor conductivity leading to poor cell performance. These electrolytes are thus typically used in cells with molten electrodes wherein surface contact of electrolyte and electrode is assured by the fluid form of the electrodes.

It is therefore an object of the present invention to increase the conductivity of the cathode of primary room temperature operable solid state cells in conjunction with high energy density anodes and compatible electrolytes such that there is an increase in energy density without current capability losses resulting from the addition of inert conductive materials, while maintaining chemical stability between the cell components.

It is a further object of the present invention to provide a primary high energy density cell having a non-conductive high energy density cathode material admixed with a conductive cathode cathode active materials whereby the use of non-cathode active conductors is minimized or eliminated.

Generally the present invention involves the incorporation into the cathode of a solid state cell of a material which has the characteristics of being both ionically and electronically conductive as well as being able to function as an active cathode material. Normally cathodes in solid state cells, operable at room temperature, require the incorporation of substantial amounts (e.g. over 20 percent by weight) of an ionic conductor such as that used as the electrolyte in order to facilitate ionic flow in the cathode during the cell reaction. This is especially true if the cathodic material is an electronic conductor since otherwise a reduction product would form at the cathode-electrolyte interface which would eventually block off a substantial amount of the ionic flow during discharge. However, the incorporated ionic conductors in prior art cells have not generally been cathode active materials with the result of significant capacity loss. Fluid type cells including those with molten electrodes and cells used at elevated temperatures do not generally encounter such ionic conductivity problems since high temperature and fluid states accelerate ionic flow. Accordingly, there are little capacity losses engendered by the incorporation of non-active ionic conductors. Additionally, as an aggravation of capacity loss in solid state cells, cathode active materials which are poor electronic conductors as well will require the further incorporation of electronically conductive materials which further reduces the cells energy capacity. By combining the functions of electronic and ionic conductivity with cathode activity a higher energy density and current capability is attained in room temperature solid state cells with the need for space wasting conductors being obviated.

Examples of materials having the requisite characteristics of ionic and electronic conductivity and which are cathodically active as well as being compatible with electrolytes used in high energy density cells include the following metal chalcogenides: $CoTe_2$, $Cr_2S_3$, $HfS_2$, $HfSe_2$, $HfTe_2$, $IrTe_2$, $MoS_2$, $MoSe_2$, $MoTe_2$, $NbS_2$, $NbSe_2$, $NbTe_2$, $NiTe_2$, $PtS_2$, $PtSe_2$, $PtTe_2$, $SnS_2$, $SnSSe$, $SnSe_2$, $TaS_2$, $TaSe_2$, $TaTe_2$, $TiS_2$, $TiSe_2$, $TiTe_2$, $VS_2$, $VSe_2$, $VTe_2$, $WS_2$, $WSe_2$, $WTe_2$, $ZrS_2$, $ZrSe_2$, and $ZrTe_2$, wherein the chalcogenide is a sulfide, selenide, telluride or a combination thereof.

Also included are the non-stoichiometric metal chalcogenide compounds such as $Li_xTiS_2$ where $x<1$, which to some extent contain the complexed form of one of the cathode materials with the anode cation and which are believed to be intermediate reaction products during cell discharge.

In order for the ionically-electronically conductive cathode active material to be commercially useful in high voltage cells with lithium anodes it should be able to provide a voltage couple with lithium of at least an O.C.V. of 1.5 volts and preferably above 2 volts.

The operating voltage of the ionically-electronically conductive cathode active material should preferably be roughly equivalent to the voltage of the higher energy density non-conductive cathode active material mixed therewith to avoid detrimental voltage fluctuations.

A further criteria for the above cathodic material is that both the ionic and electronic conductivities of the cathode active material should range between $10^{-10}$ and $10^2$ $ohm^{-1}cm^{-1}$ with a preferred ionic conductivity of more than $10^{-6}$ and an electronic conductivity greater than $10^{-3}$, all at room temperature.

In addition, and most importantly, the ionically-electronically conductive, active cathode material must be compatible with the solid electrolytes used in the high energy density solid state lithium cells.

The solid electrolytes used in high energy density lithium cells are lithium salts and have ionic conductivities greater than $1 \times 10^{-9}$ $ohm^{-1}cm^{-1}$ at room temperature. These salts can either be in the pure form or combined with conductivity enhancers such that the current capability is improved thereby. Examples of lithium salts having the requisite conductivity for meaningful cell utilization include lithium iodide (LiI) and lithium iodide admixed with lithium hydroxide (LiOH) and aluminum oxide ($Al_2O_3$), with the latter mixture being referred to as LLA and disclosed in U.S. Pat. No. 3,713,897.

It is postulated that the aforementioned ionically-electronically conductive, cathode active materials react with the ions of the anode (i.e. lithium cations) to form a non-stoichiometric complex during the discharge of the cell. This complexing of cations allows them to move from site to site thereby providing ionic conductivity. Additionally, the above compounds provide the free electrons necessary for electronic conductivity.

The above compounds are admixed with other compounds or elements which provide a greater energy density but which cannot be utilized in and of themselves because of their inability to function as ionic and/or electronic conductors. The inclusion of the ionically-electronically conductive cathode active material thereby increases the capacity of the cell by obviating the need for non-dischargeable conductive materials. Furthermore, when the conductive active material is homogeneously admixed with the higher energy density compound the realizable utilization of the so formed cells is approximately equal to the theoretical. A limiting factor in solid state cell performance is the conductivity of the cell reaction product. A low conductivity product results in large internal resistance losses which effectively terminate cell usefulness. Thus, in cells having the above ionically-electronically conductive, cathode active material the complexed reaction product surprisingly retains conductivity thereby enabling full utilization of other active cathode materials which are in proximity therewith.

Accordingly, high energy density cathodic materials such as sulfur and iodine as well as other solid chalcogens, Se and Te, and halogens such as bromine can be effectively utilized to greater potential. Solid state cells utilizing sulfur in conjunction with lithium anodes and lithium salt solid electrolytes have shown great promise in terms of voltage obtainable and total energy density. However, one of the drawbacks has been the formation of the low ionically conductive lithium sulfide ($Li_2S$) as the cell reaction product and especially at the cathode electrolyte interface. This build up has effectively choked off the further utilization of these cells. However, the inclusion of the ionically-electronically conductive, cathode active materials provides a more uniform distribution of the reaction product throughout the cathode structure because of their ionically conductive characteristics. Since the reaction products of the ionically conductive materials retain conductivity, further utilization of the cell is also possible with the non-conductive active material in conductive proximity with the conductive active material.

In U.S. Pat. No. 3,791,867 a rechargeable cell is described which has a cathode comprised of a halogen or chalcogen as a non-active host material which facilitates recharging of the cell. In order for a cell to have practical rechargeable characteristics the electrolyte contained therein must have a high ionic conductivity generally greater than about $10^{-2}$ ohm$^{-1}$cm$^{-1}$. Electrolytes having lower ionic conductivities generally impede both the discharge and recharging rates of cells containing them. These cells which are discharged at necessarily low rates can only be recharged at similar low rates. A cell having a discharge life of about 10 years would thus be expected to require a similar 10 year period for being recharged and is not considered a rechargeable cell.

The cells described in the aforesaid patent, in keeping with the objectives of the patent, all contain electrolytes therein which render them capable of being recharged. Cells containing the fluid organic electrolytes as described are generally rechargeable since the fluid state of the electrolyte facilitates ionic flow with concomitant high ionic conductivity. Cells containing the specific solid electrolytes described therein are also capable of being recharged. Not only do the barium magnesium sulfide and selenide specifically referred to have high ionic conductivities at room temperature, they are also generally utilized in molten electrode cells as previously described. Because of the high operating temperatures of molten electrode cells high ionic conductivity of the electrolyte is assured with such cells being generally rechargeable. The rubidium silver iodide solid electrolyte also described in the patent is commonly referred to as a "super" solid ionic conductor with an ionic conductivity sufficiently high, as previously described, whereby it can also be utilized in rechargeable solid state cells. All the solid electrolytes described in the patent are however incompatible with lithium anodes and in fact there are no presently known solid electrolytes which are both compatible with lithium and which have room temperature ionic conductivities sufficiently high for practical rechargeability purposes. Thus, the non-cathode active transition metal chalcogenides utilized in the patent for their rechargeable characteristics would be of little or no value in solid state lithium cells wherein rechargeability, as a practical matter, is precluded. However, it has been discovered that the above enumerated ionically-electronically conductive, cathode active metal chalcogenides have characteristics in conjunction with non-conductive cathodes such as halogens or chalcogens whereby the energy density of primary solid state lithium cells is greatly enhanced. The ionically-electronically conductive, cathode active metal chalcogenides replace the non-cathode active conductive materials, previously utilized, with the reaction products of the metal chalcogenides further retaining conductivity whereby full practical utilization of nearly all the cathode materials becomes possible.

Non-stoichiometric complexing of the metal chalcogenides surprisingly provides the full extent of the reaction of the metal chalcogenides. Accordingly, they are also stable in conjunction with lithium cell electrolytes such as the aforementioned LLA. There are no side reactions of, for example, titanium disulfide with lithium iodide ($TiS_2 + 4LiI \rightarrow TiI_4 + 2Li_2S$) as may be expected, to at least a small extent, at the cathode-electrolyte interface. The formation of non-conductive $TiI_4$ or $Li_2S$ at such interface, may even in small amounts choke off further cell reaction in solid state cells whereas in cells with a fluid interface between cathode and electrolyte the formation of such reactants would have minimal effect if any.

Though the metal chalcogenides are ionically conductive, a small amount of electrolyte may however be included in the cathode structure in order to blur the interface between cathode and electrolyte thereby providing more intimate electrical contact between the cathode and the electrolyte. This enables the cell to operate at higher current drains for longer periods of time. Additionally, the electrolyte inclusion can increase the ionic conductivity of the cathode should the ionically conductive cathode active material have a lower conductivity than that of the electrolyte. This inclusion or inclusion of other ionic conductors, if made, should not exceed 10% by weight since greater amounts would merely decrease the energy density of the cell with little if any further tradeoff in terms of current drain capacity.

The following examples illustrate the high energy density and utilizability of a sulfur containing cathode in a solid state cell with the abovementioned ionically and electronically conductive cathode active metal chalcogenides. Sulfur in and of itself cannot be used as a cathode in a solid state cell unless it contains substantial amounts of ionic and electronic conductors which constitute 60% or more of the total cathode by weight. Thus, the inclusion into a cathode of sulfur of an ionically and electronically conductive metal chalcogenide such as titanium disulfide enables the use of sulfur without the concomitant severe losses of energy capacity. Titanium disulfide is both a good ionic and electronic conductor ($10^{-5}$ ohm$^{-1}$cm$^{-1}$ room temperature ionic conductivity and greater than $10^{-2}$ ohm$^{-1}$cm$^{-1}$ room temperature electronic conductivity) and also functions as a reactive species in the cell reaction with lithium cations to form the nonstoichiometric $Li_xTiS_2$ which is also ionically and electronically conductive thus further ameliorating the other problem of non-conductive reaction products choking off further cell reaction. In addition $TiS_2$ generally discharges at a voltage similar to that of sulfur i.e. 2.3 volts and thus the cell voltage is steady without cell voltage fluctuations.

In the following examples as throughout the entire specification and claims all parts and percentages are parts by weight unless otherwise specified. The examples are given for illustrative purposes only, and specific details are not to be construed as limitations.

EXAMPLE 1

A solid state cell is made from a lithium metal disc having dimensions of about 1.47 cm$^2$ surface area by about 0.01 cm thickness; a cathode disc having dimensions of about 1.82 cm$^2$ surface area by about 0.02 cm thickness, consisting of 80% $TiS_2$ and 20% S, and weighing 100 mg; and a solid electrolyte therebetween with the same dimensions as the cathode and consisting of LiI, LiOH, and $Al_2O_3$ in a 4:1:2 ratio. The electrolyte is first pressed to the cathode at a pressure of about 50,000 psi. The resulting cell is discharged at room temperature under a load of 100 k$\Omega$. The cell provides 26 milliamp hours (mAH) to 2 volts, about 41 mAH to 1.5 volts, and in excess of 46 mAH to 1 volt. The cell has a realizable capacity in excess of 12 watt hours/in$^3$.

The following Table illustrates the results obtained from cells tested under condition of different loads or temperatures and having differing cathode weight, cathode-electrolyte interface surface area or relative percentages of TiS$_2$ to S with resulting capacity limits to 2, 1.5 and 1 volt.

It should be noted from the Examples that cells discharged at 37° C. show even greater capacity than those cells discharged at room temperature and under the same load.

TABLE

| Example No. | % TiS$_2$:S | surface area (cm$^2$) | weight (mg) | discharge load KΛ | Temperature | mAH to 2 volts | 1.5 volts | 1 VC |
|---|---|---|---|---|---|---|---|---|
| 1 | 80:20 | 1.82 | 100 | 100 | Room | 26 | 41 | 46 |
| 2 | 80:20 | 1.82 | 100 | 50 | Room | 16 | 34 | 40 |
| 3 | 80:20 | 1.82 | 100 | 20 | Room | 6 | 24 | 30 |
| 4 | 80:20 | 1.71 | 100 | 50 | 72° C. | 32 | 39 | 42 |
| 5 | 80:20 | 1.71 | 100 | 20 | 72° C. | 27 | 37 | 40 |
| 6 | 80:20 | 1.71 | 100 | 10 | 72° C. | 18 | 35 | 41 |
| 7 | 60:40 | 1.82 | 100 | 18μA (~100μ) | Room | 11 | 28 | 31 |
| 8 | 60:40 | 1.82 | 100 | 10 | 72° C. | 9 | 19 | 21 |
| 9 | 80:20 | 1.82 | 700 | 200 | 37° C. | 110+ | | |
| 10 | 80:20 | 1.82 | 700 | 100 | 37° C. | 55 | 110+ | |
| 11 | 80:20 | 1.82 | 700 | 77.5 | 37° C. | 40 | 90 | 110+ |
| 12 | 80:20 | 1.82 | 700 | 50 | 37° C. | 25 | 55 | 70 |
| 13 | 80:20 | 1.82 | 700 | 30 | 37° C. | 8 | 26 | 35 |
| 14 | 80:20 | 1.82 | 700 | 20 | 37° C. | 5 | 21 | 31 |
| 15 | 80:20 | 1.82 | 700 | 200 | Room | 72 | 110+ | |
| 16 | 80:20 | 1.82 | 700 | 100 | Room | 38 | 80 | 102 |
| 17 | 80:20 | 1.82 | 700 | 77.5 | Room | 28 | 55 | 65 |
| 18 | 80:20 | 1.82 | 700 | 50 | Room | 12 | 39 | 50 |
| 19 | 80:20 | 1.82 | 700 | 30 | Room | 5 | 15 | 18 |
| 20 | 80:20 | 1.82 | 200 | 270 | 37° C. | 50+ | | |
| 21 | 80:20 | 1.82 | 200 | 100 | 37° C. | 35 | 52 | 64 |
| 22 | 80:20 | 1.82 | 200 | 52 | 37° C. | 25 | 45 | 55 |

Thus since 37° C. is human body temperature, cells utilizing the present invention can be used in pacemakers with the capability of lasting in excess of 10 years thereby greatly reducing the need for surgery necessitated by the need for implanting fresh batteries.

Additionally, the 80:20 ratio of TiS$_2$ to S by weight, roughly equivalent to a mole-to-mole ratio, provides a greater useful capacity than the 60:40 ratio despite the increased amount of the higher energy density sulfur in the latter. With the mole-to-mole ratio, three lithiums can react stoichiometrically in the cell reactions i.e. 2Li+S→Li$_2$S and Li+TiS$_2$→LiTiS$_2$. These reactions provide a three electron change with both a high voltage and a high capacity. The mole-to-mole ratio of TiS$_2$ to S provides for complete stoichiometric utilization and is thus highly preferred.

EXAMPLE 2

A cell made with the materials of Example 1 the dimensions of 1.258"OD and 0.085" thickness, a cathode of 1.5 grams is made as the back cover of a tritium illuminated liquid crystal display (LCD) watch. A limiting resistor of 330KΩ limits the voltage applied to the watch. The operating current for the abovementioned watch ranges between 1 and 3 μA. Thus, with a stoichiometric capacity of 750 mAH and assuming a conservative utilizability of ⅔ capacity the cell is theoretically capable of powering the watch at an average drain rate of 2 μA and a voltage in excess of 2.2 volts for about 28.5 years. The lifetime of such cells is in excess of the lifetime of the currently produced watches themselves. Accordingly, with the stability of solid state cells in general and the capacity of the present cell in particular, batteries can be made as integral parts of electrical componentry such as watches rather than as a part requiring constant replacement.

EXAMPLE 3

A cell made in accordance with that of Example 1 is made but with tantalum disulfide (TaS$_2$) in place of titanium disulfide (TiS$_2$) and a weight ratio to sulfur of 87.5:12.5. Upon discharge of the cell at 72° C. under a load of 10 kΩ the cell realizes 6 mAH to 2 volts, 18 mAH to 1.5 volts and 24 mAH to 1 volt.

EXAMPLE 4

A cell made in accordance with the previous Example is discharged at 72° C. under a load of 20 KΩ. The cell realizes 14 mAH to 2 volts, 25 mAH to 1.5 volts and about 28 mAH to 1 volt.

It is understood that changes and variations of the invention as described herein can be made without departing from the scope of the present invention as defined in the following claims.

What is claimed:

1. A method for increasing the realizable primary energy density of a room temperature operable primary solid state electrochemical cell having a lithium anode, a solid electrolyte comprised of a lithium salt and having a room temperature ionic conductivity in excess of $1 \times 10^{-9}$ ohm$^{-1}$cm$^{-1}$, and a solid cathode comprised of a non-conductive high energy density cathode active material selected from the group consisting of sulfur, selenium, tellurium, bromine and iodine, said method consisting essentially of the step of adding to said cathode active material a second material which is both electronically and ionically conductive and which second material is also cathode active, said second material consisting of one or more metal chalcogenides having electronic and ionic conductivities ranging between $10^{-10}$ and $10^2$ ohm$^{-1}$cm$^{-1}$, whereby said cathode is substantially devoid of other electronic conductive materials and whereby said cathode contains less than 10% of other ionic conductive materials.

2. The method of claim 10 wherein said one or more metal chalcogenides is selected from the group consisting of CoTe$_2$, Cr$_2$S$_3$, HfS$_2$, HfSe$_2$, HfTe$_2$, IrTe$_2$, MoS$_2$, MoSe$_2$, MoTe$_2$, NbS$_2$, NbSe$_2$, NbTe$_2$, NiTe$_2$, PtS$_2$, PtSe$_2$, PtTe$_2$, SnS$_2$, SnSSe, SnSe$_2$, TaS$_2$, TaSe$_2$, TaTe$_2$, $TiS_2$, $TiSe_2$, $TiTe_2$, $VS_2$, $VSe_2$, $VTe_2$, $WS_2$, $WSe_2$, $WTe_2$, $ZrS_2$, $ZrSe_2$, and $ZrTe_2$.

3. The method of claim 2 wherein said metal chalcogenide is $TiS_2$.

4. The method of claim 3 wherein said high energy density cathode active material is sulfur.

5. The method of claim 4 wherein said cathode consists of said cathode active materials without said other ionic conductive materials.

6. The method of claim 5 wherein said $TiS_2$ and said sulfur are admixed in a 1:1 mole ratio.

7. The method of claim 6 wherein said lithium salt is lithium iodide.

8. A cell made in accordance with the method of claim 1.

9. A cell made in accordance with the method of claim 2.

10. A cell made in accordance with the method of claim 3.

11. A cell made in accordance with the method of claim 4.

12. A cell made in accordance with the method of claim 5.

13. A cell made in accordance with the method of claim 6.

14. A cell made in accordance with the method of claim 7.

* * * * *